US009231387B2

(12) United States Patent
Benner et al.

(10) Patent No.: US 9,231,387 B2
(45) Date of Patent: Jan. 5, 2016

(54) SYSTEM FOR INSERTING AND REMOVING CABLES

(71) Applicant: International Business Machines Corporation, Armonk, NY (US)

(72) Inventors: Alan F. Benner, Poughkeepsie, NY (US); Eric J. McKeever, Poughkeepsie, NY (US); Thong N. Nguyen, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/791,119

(22) Filed: Mar. 8, 2013

(65) Prior Publication Data

US 2014/0250683 A1    Sep. 11, 2014

(51) Int. Cl.
  *H01R 43/26* (2006.01)
  *H02G 1/14* (2006.01)
(52) U.S. Cl.
  CPC ............... *H02G 1/14* (2013.01); *H01R 43/26* (2013.01); *Y10T 29/49117* (2015.01); *Y10T 29/53252* (2015.01)
(58) Field of Classification Search
  CPC ...... H01R 43/00; H01R 43/052; H01R 43/20; H01R 43/26; H02G 1/14; Y10T 29/53252; Y10T 29/49117
  See application file for complete search history.

(56) References Cited

U.S. PATENT DOCUMENTS

| 4,936,662 A | | 6/1990 | Griffin | |
|---|---|---|---|---|
| 4,946,398 A | * | 8/1990 | Takenouchi et al. | 439/599 |
| 4,959,023 A | * | 9/1990 | Watanabe et al. | 439/595 |
| 4,975,082 A | * | 12/1990 | Nagasaka et al. | 439/595 |
| 4,986,764 A | | 1/1991 | Eaby et al. | |
| 5,299,959 A | * | 4/1994 | Yamamoto et al. | 439/752 |
| 5,716,234 A | * | 2/1998 | Phillips | 439/595 |
| 8,287,191 B2 | | 10/2012 | Nielson et al. | |
| 8,306,380 B2 | | 11/2012 | Leatherman et al. | |
| 2009/0274432 A1 | | 11/2009 | Iwaya | |
| 2009/0318007 A1 | | 12/2009 | Bloomfield | |
| 2011/0019962 A1 | | 1/2011 | Childers et al. | |
| 2012/0033922 A1 | | 2/2012 | Nakagawa | |
| 2012/0251051 A1 | | 10/2012 | Wakjira et al. | |
| 2012/0251054 A1 | | 10/2012 | Chan et al. | |

FOREIGN PATENT DOCUMENTS

| CN | 202041695 U | | 11/2011 |
|---|---|---|---|
| DE | 4010440 | * | 10/1991 |
| EP | 1321786 B1 | | 6/2003 |
| JP | 2003029089 A | | 1/2003 |
| JP | 5072980 B2 | | 11/2012 |
| KR | 1020087021250 A | | 8/2008 |

OTHER PUBLICATIONS

Non-Final Office Action for U.S. Appl. No. 14/508,292 dated Apr. 9, 2015; 23 pages.

* cited by examiner

*Primary Examiner* — Carl Arbes
(74) *Attorney, Agent, or Firm* — Cantor Colburn LLP; Steven Chiu

(57) ABSTRACT

A method and system for installing and removing a row of cables from a cable array is provided. The method includes providing an installation tool having a first body with a plurality of arms extending from one side. The plurality of arms being configured to receive a cable connector body, the plurality of arms including at least one first projection extending from one of the plurality of arms. The installation tool is moved onto a row of cables held coupled together by a bracket, each of the cables in the row of cables having a cable connector body. The connector bodies are engaged into receptacles and the bracket is moved with the at least one first projection.

3 Claims, 14 Drawing Sheets

SYSTEM FOR INSERTING AND REMOVING CABLES

BACKGROUND

The present application relates to a system for inserting and removing cables from computer receptacles and in particular to a system for inserting and removing entire rows of cables.

One issue in the design of high-performance computing or networking equipment is the issue of interconnection between printed circuit boards (PCBs), i.e., from one PCB to another PCB. Within a PCB, electronic processing circuitry can be interconnected using wiring layers within the printed circuit board. This type of interconnect can provide high performance and density—supporting up to thousands of interconnection wires, operating at rates potentially greater than 1-10 Gbps. However, interconnections between PCBs are more difficult, requiring either backplane-style boards that the interconnecting circuit boards plug into using backplane connectors, or cables. This results in the use of cable connectors (or backplane-style connectors) and bulk cable with wires or flex circuitry. As processing circuitry has steadily improved in performance and density, these board-to-board interconnection methods have become an increasingly-large bottleneck in design, since the density and bandwidth performance of cable connectors and electrical backplane connectors has not increased at the same rate as the processing circuitry.

BRIEF SUMMARY

In accordance with an embodiment, a method is provided. The method includes providing an installation tool having a first body with a plurality of arms extending from one side, the plurality of arms being configured to receive a cable connector body, the plurality of arms including at least one first projection extending from one of the plurality of arms. The installation tool is moved onto a row of cables held coupled together by a bracket, each of the cables in the row of cables having a cable connector body. The connector bodies are engaged into receptacles. The bracket is moved with the at least one first projection.

Another embodiment is directed to a tool for installing a row of cables from a cable array is provided. Each cable includes a connector configured to couple with a receptacle and a tab member configured to disengage the connector from the receptacle. The tool includes a body. A plurality of arms extending from one end of the body, the plurality of arms defining a plurality of openings, each of the plurality of openings sized to receive one of the connectors. At least one projection extends from an end of at least one of the plurality of arms.

Still another embodiment is directed to a tool for removing a row of cables from a cable array is provided. Each cable includes a connector configured to couple with a receptacle and tab member configured to disengage the connector from the receptacle. The tool includes a body. A handle portion is arranged on one side of the body. A plurality of engagement members extend from one side of the body, each of the plurality of engagement members having a first projection and a second projection separated by a slot, the slot being configured to receive one of the tab members.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
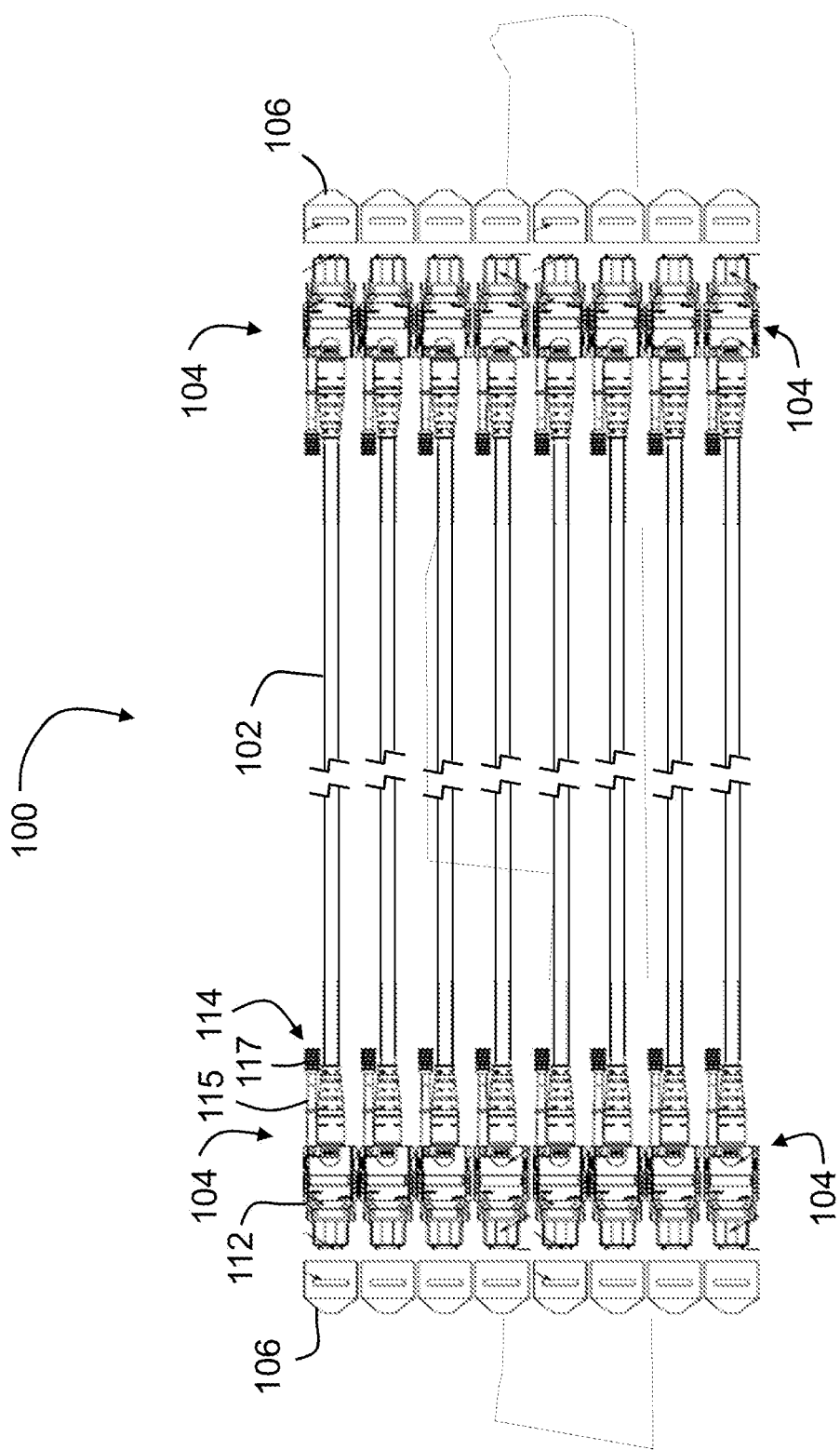
FIG. 1 illustrates an exemplary row of cables in accordance with one or more embodiments.

Embodiments of the disclosure may be used in connection with interconnection networks for computers, switches and other information technology equipment, such as high-density networks for large clustered systems, high-performance computing and supercomputing systems, and cloud computing systems, for example. Embodiments of the disclosure may be applied in the area of electrical backplanes or optical backplanes, arrays of cables, connector arrays, and cable harnesses that interconnect, e.g., dozens or hundreds of switching elements, also termed switches or switch ICs or switch chips.

Embodiments of the disclosure may be used in connection with so-called "all-to-all" or "full mesh" networks, in one or more levels, where a multiplicity of switching elements (on the order of 16 to 64 or 128 switching elements in some embodiments) each have links to most or all of the other switching elements. Such networks, with ports interconnecting each switching element or with a large number of other switching elements (i.e., "high-radix" switching elements) are only recently technically feasible and cost-effective. Previously, integrated circuit switching chips could only be cost-effectively constructed using commonly-available CMOS integrated circuit technology, with a moderate number (e.g., 8-24) of ports. Such "all-to-all" or "full mesh" networks may be used to avoid or mitigate against deficiencies, such as congestion and extra latency that may be inherent in Multistage Interconnection networks using other topologies, such as Torus (in 2, 3, 4, 5, 6, or more dimensions), or Omega (also called "Butterfly" or "Clos", or "Fat Tree") topologies, where traffic must traverse several intermediate switching elements to traverse the network.

While all-to-all or full-mesh networks may have advantages over other network topologies in terms of performance, routing simplicity, and robustness against link failures, they might have several disadvantages or deficiencies. Such deficiencies may include one or more of: (a) each switching element must support a large number of ports, which must be tightly-packed, requiring high-density connector packing, (b) the network requires a large number (on the order of $n^2$) of interconnecting cables, and (c) the interconnecting cables form a complex topology, since the links connecting to each of the switching elements are "shuffled" and distributed across all of the other switching elements.

In order to address or alleviate one or more of the aforementioned deficiencies, embodiments of the disclosure may be used to simplify the construction and manufacturing of such all-to-all interconnection networks. In some embodiments, a generic decomposition of a single all-to-all interconnection network topology into a multiplicity of smaller all-to-all interconnection network elements may be provided, which can be replicated in a modular fashion, to construct the full topology. In this manner, an all-to-all topology may be broken down into units that can be replicated, where each unit may be larger or include more connections than a base-unit of a wire.

In the specific illustrative instance of optical networks with even numbers of drawers or books or blades, each containing a multiple of four (4) switching elements, use of multiple "shuffle cables" may be provided, where each shuffle cable may implement a 4×4 all-to-all topology, with a link width of one (1) or more fibers per link direction. Illustrative embodiments described herein show a topology with a drawer that contains eight (8) switching elements, and each link encompasses (6+6) fibers (i.e., six (6) fibers in each of the two directions), which implies that the entire structure may incorporate a modular aggregation of twenty-four (24) shuffle cables, with each shuffle cable implementing a 4×4×(6+6) all-to-all topology, incorporating one-hundred ninety-two (192) separate optical fibers or waveguides channels. Since each of the twenty-four (24) shuffle cables incorporates four (4) connectors on each of the two (2) ends, this complete optical backplane assembly may incorporate a total of one-hundred ninety-two (192) connectors, each of which may be a 48-fiber connector, using a standard "MT" or "MPO" Multi-fiber Push On/Pull Off optical connector design.

Embodiments of the disclosure may be used to enclose all (e.g., 4,608) fibers in 192 connectors and 24 "shuffle cartridges" in a high-density aggregation of approximately 4"×16"×8". An enclosure may incorporate both rigid and flexible components, providing: (a) close mechanical tolerances for connector plugging within each of the drawers (i.e., to approximately +/−0.1 millimeters in each of the 3 dimensions), while simultaneously maintaining looser mechanical tolerances (i.e., to approximately +/−5 millimeters) among the drawers, (b) robust protection of delicate optical fibers within a rigid shell, casing, or enclosure, and (c) incorporation of "gang-plug" handles that each actuate a multiplicity of the MPO.

Embodiments of the disclosure may include one or more cables, such as a fiber optic cable 102 for example. A cable may be configured to convey multiple arrays of signals from multiple multi-fiber optical connectors associated with a first printed circuit board (PCB) to multiple multi-fiber optical connectors associated with a second or another PCB.

Figure 2:
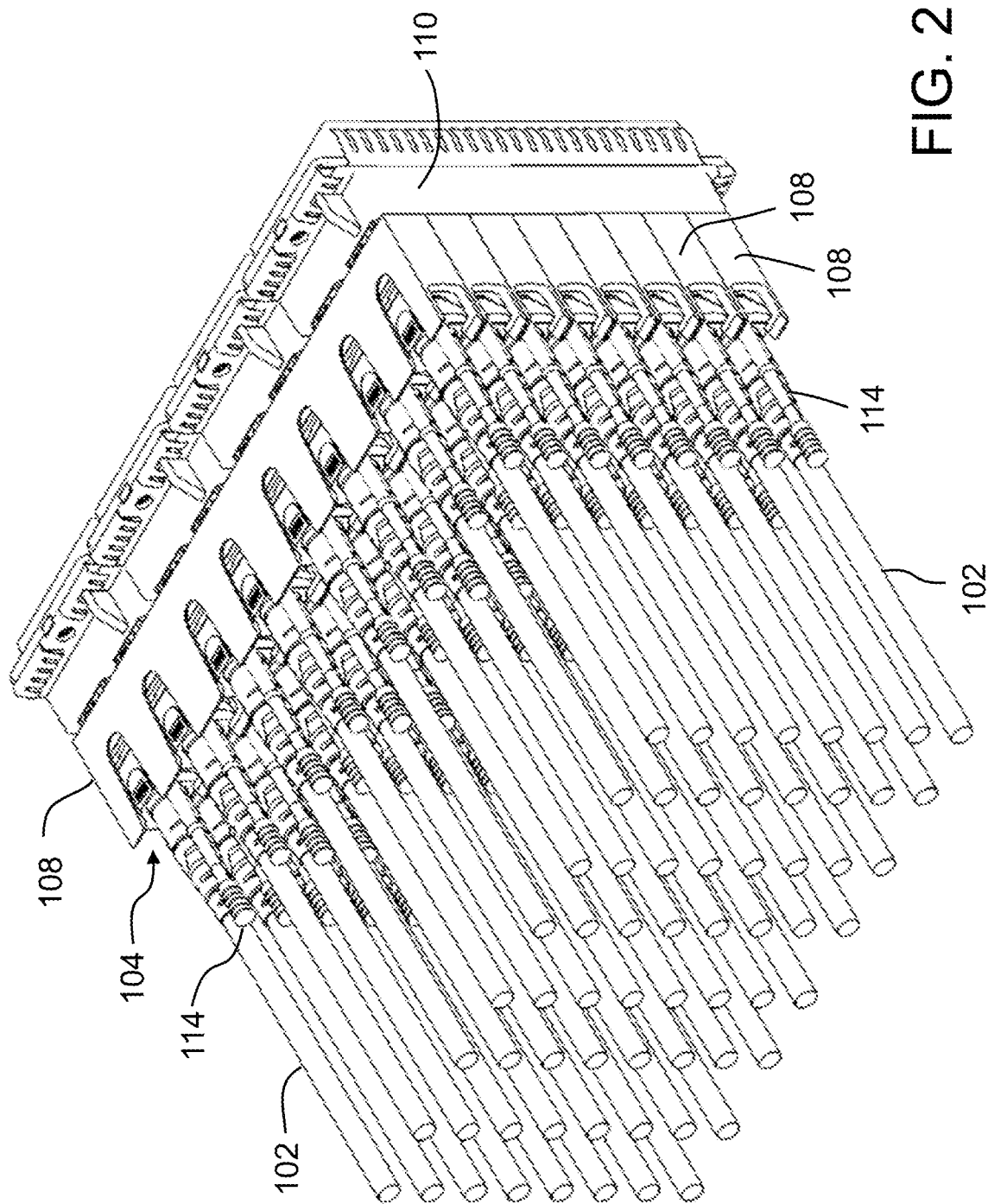
FIG. 2 illustrates an exemplary array of cables coupled to a receptacle block in accordance with one or more embodiments.

An illustrative set of cables 100 is shown in FIG. 1. The cable 100 may contain a number of optical fibers. For example, in some embodiments the set of cables 100 may be arranged in rows of eight cables 102, each having a connector 104 on each end. The cables may be those described in U.S. patent application Ser. No. 12/614,391 entitled "Removable Sleeve for Fiber Optic Connectors for High Density Applications" filed on Nov. 6, 2009, which is incorporated herein by reference. Each row of cables may be grouped together with eight other rows to form an 8×8 matrix or block as shown in FIG. 2 that couple with receptacles 106 in a drawer 110. It should be appreciated that the drawer 110 includes a corresponding number of receptacles 106. To assist in organizing, aligning and maintaining the connectors 104, a bracket 108 or grouper member may be used for holding the connectors 104 during insertion and removal.

Each of the connectors 104 includes a body 112 that is configured to couple the cable 102 to the receptacle 106 to allow signals to pass therebetween. The body 112 further includes an attachment mechanism, such as a snap fit for example, which mechanically couples the connector 104 to the receptacle 106. To facilitate the coupling and uncoupling of the body 112 from the receptacle 106 a tab member 114, sometimes called a "push/pull tab," is provided that allows the operator to engage and disengage the attachment mechanism. In the exemplary embodiment, by moving the tab member 114 away from the receptacle 106 the attachment mechanism is disengaged.

Figure 3:
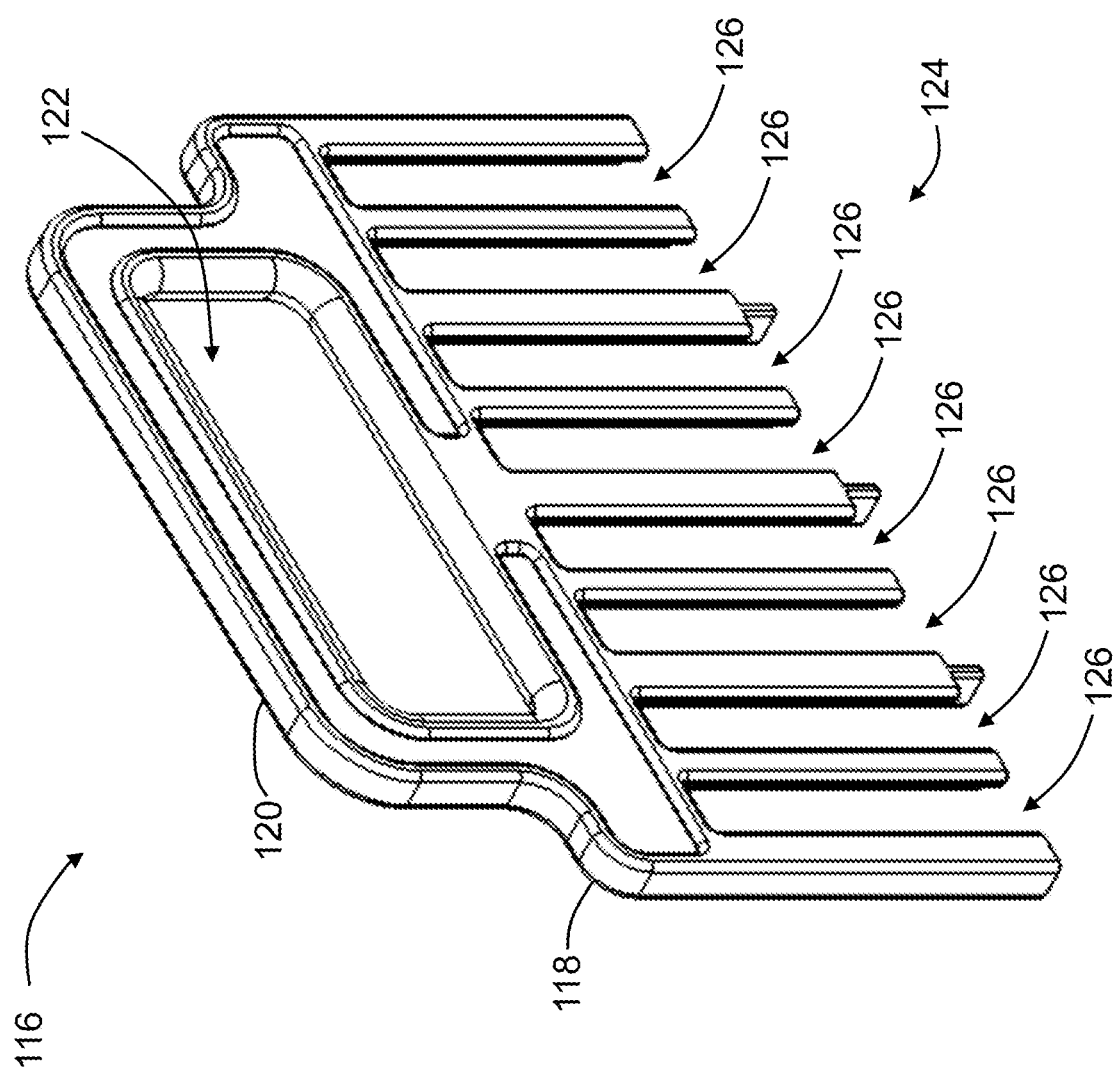
FIG. 3 illustrates a perspective view of an exemplary installation tool in accordance with one or more embodiments.
Figure 4:
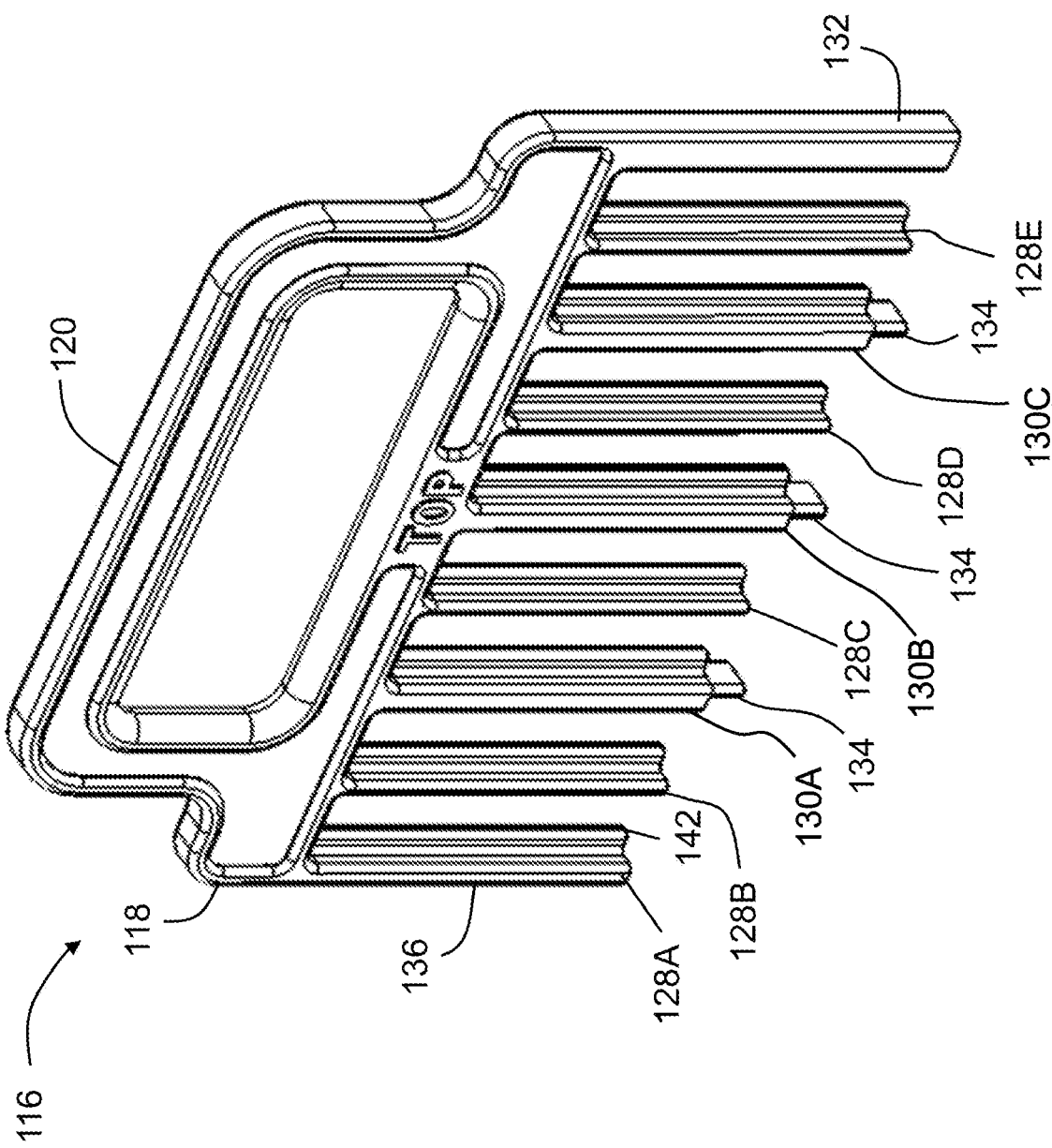
FIG. 4 illustrates a reverse perspective view of the installation tool of FIG. 3.
Figure 5:
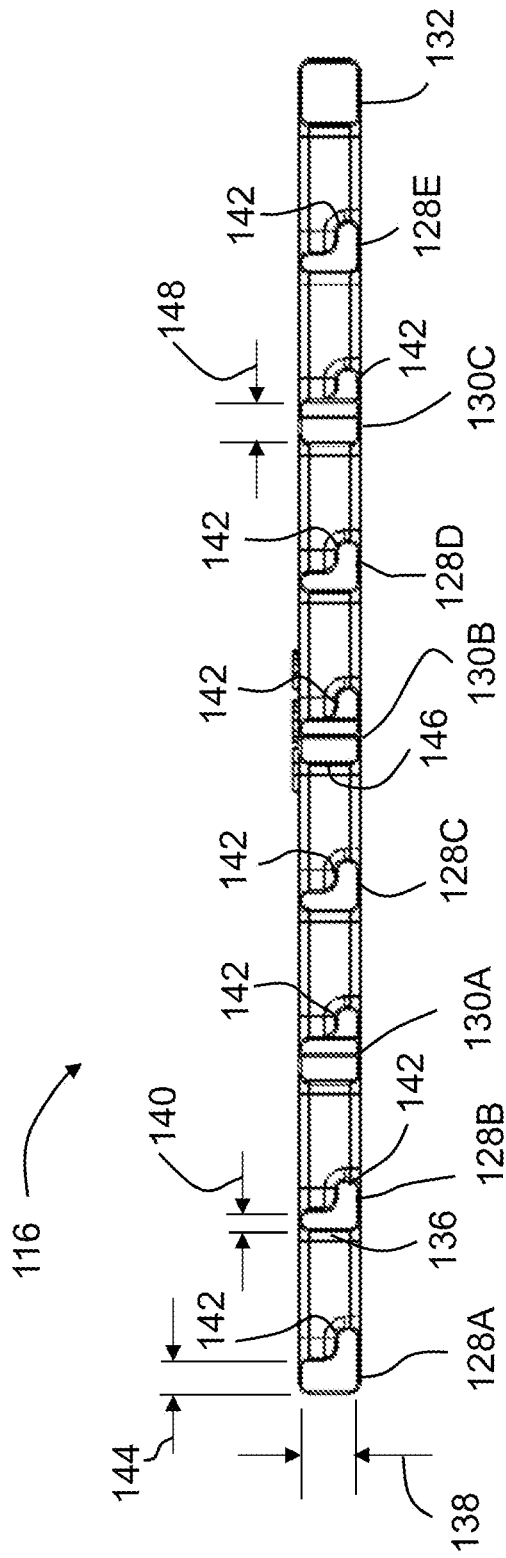
FIG. 5 illustrates an end view of the installation tool of FIG. 3.

Referring now to FIGS. 3-5, an insertion tool 116 is provided that provides advantages in facilitating the insertion of a row of cables 102 into a row of receptacles 106 in drawer 110. The insertion tool 116 includes a generally planar body 118 that has a U-shaped portion 120 that extends from one side. The U-shaped portion 120 defines an opening 122 that is sized to receive the operator's fingers. During use, the operator inserts their fingers through the opening 122 and grasps the U-shaped portion 120 to allow the operator to firmly hold the insertion tool 116.

Opposite the U-shaped portion 120, the insertion tool 116 includes a plurality of arms 124 that extend outward from the body 118 (e.g. away from the U-shaped portion 120). In the exemplary embodiment, the insertion tool includes N+1 arms, where "N" is the number of cables 102 in the row being inserted. The plurality of arms 124 are spaced apart to define openings 126 that are sized to receive the connectors 104. In the exemplary embodiment, the plurality of arms 124 includes a plurality of second arms 128, a plurality of third arms 130 and a fourth arm 132. Each of the plurality of third arms 130 includes a projection 134 that extends from an end opposite the body 118. In the exemplary embodiment, the plurality of second arms 128 is interspersed between the plurality of third arms 130. For example, the arm 130A is arranged between the arms 128B, 128C while the arm 130B is between the arms 128C, 128D and the arm 130C is between the arms 128D, 128E.

Figure 7:
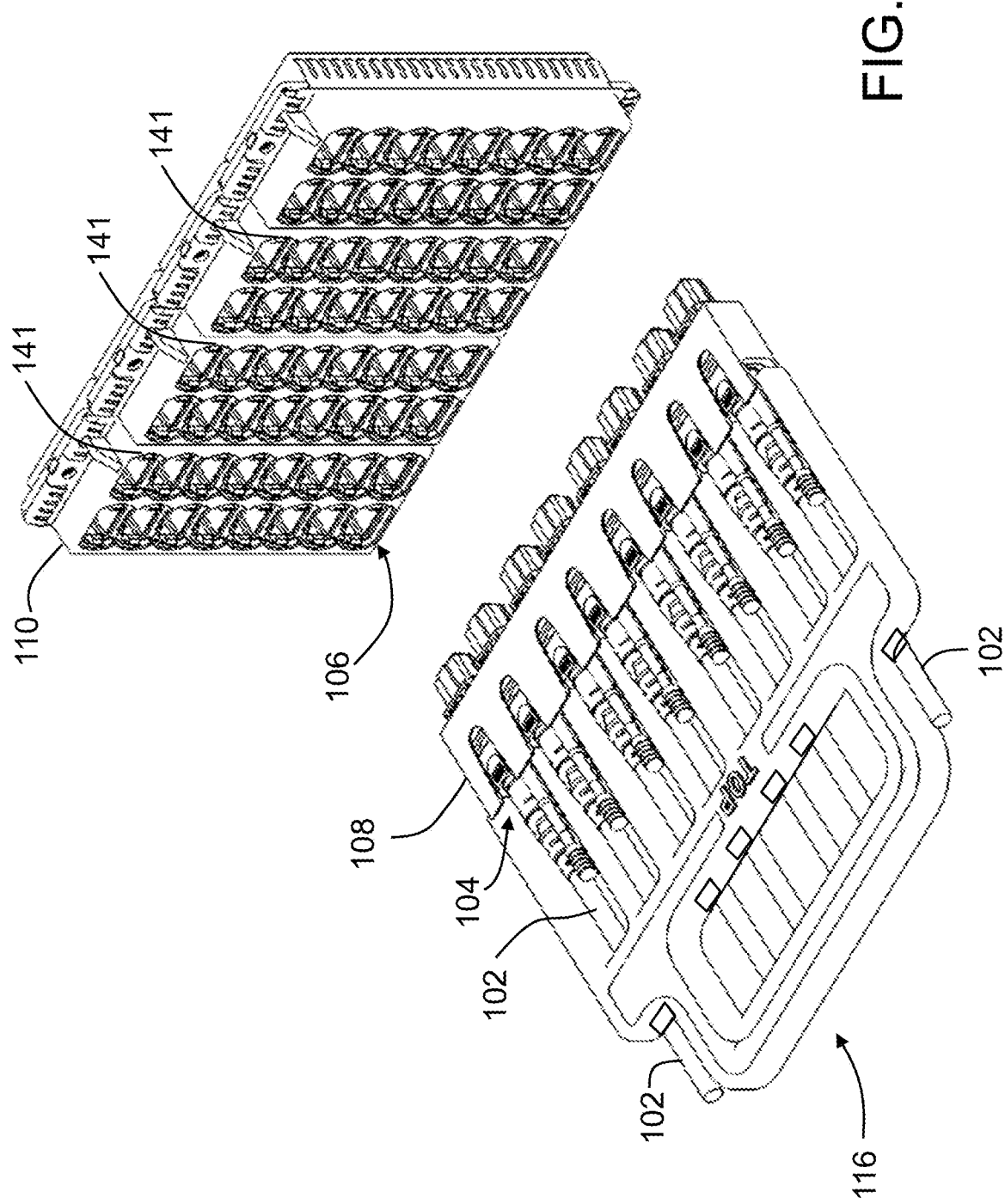
FIG. 7 illustrates the installation of a row of cables into receptacles using the installation tool of FIG. 3 in accordance with one or more embodiments.

The arms 128 each have a body portion 136 having a height 138 that is generally the same as the body 118 and a width 140. In one embodiment, the width 140 is larger on some arms 128 to accommodate non-uniform receptacle 106 spacing due to walls 141 (FIG. 7). In one embodiment, the arm 128A has a width 144 that is larger than the width 140 of the other arms 128 to provide additional structural support. Further, each arm 128 includes a flange 142 that extends generally perpendicular to the body portion 136 in a direction towards the arm 132. The flange 142 forms an L-shaped structure that allows the arms 128 to fit tightly against the connectors 104 without interfering with the tab member 114.

The arms 130 are similarly arranged to the arms 128 having a body portion 146 and a width 148. In the exemplary embodiment, the width 148 is larger than the width 140. The arms 130 also include a flange 142 that extends generally perpendicular to the body portion 146 in a direction toward the arm 132. The arm 132 does not include a flange, but rather has a substantially uniform thickness along the length since there is no adjacent tab member that it will interfere with. In one embodiment, the arm 132 has a square profile.

Figure 6:
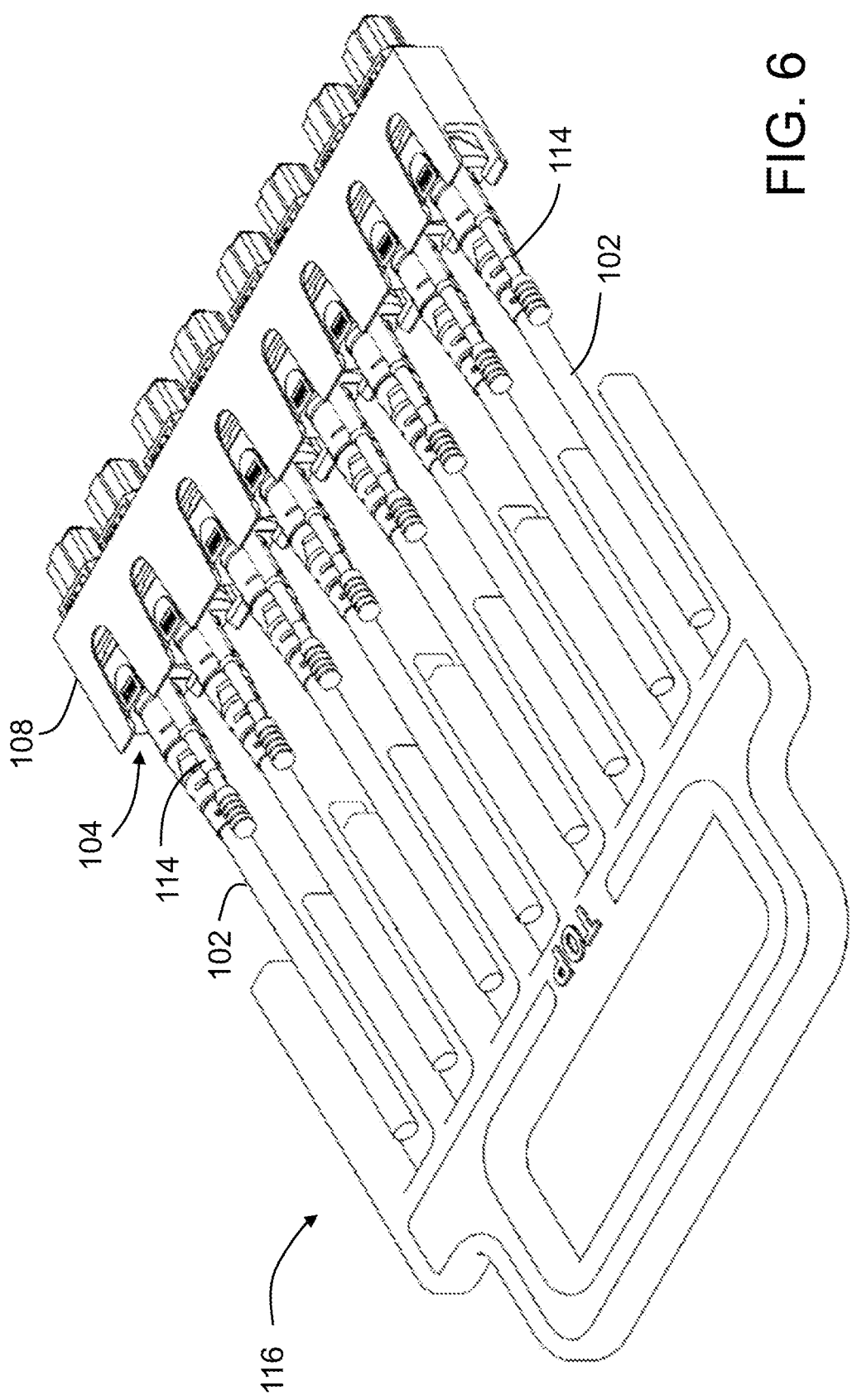
FIG. 6 illustrates a perspective view of the installation tool of FIG. 3 being coupled to a row of cables in accordance with one or more embodiments.
Figure 8:
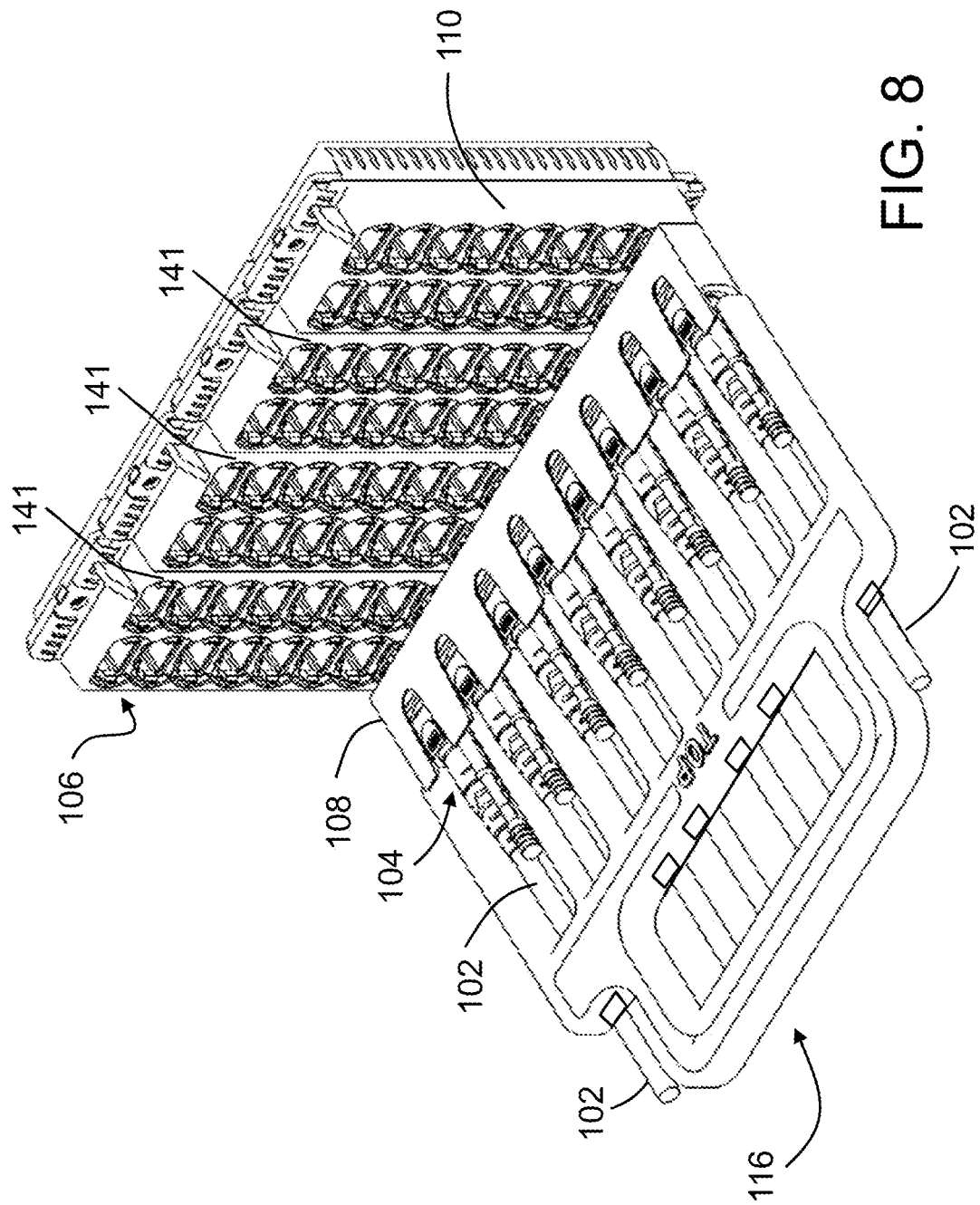
FIG. 8 illustrates a perspective view of the row of cables installed in the receptacles using the installation tool of FIG. 3 in accordance with one or more embodiments.

Referring now to FIGS. 6-8, the operation of the insertion tool 116 will be described. First the operator prepares the cables 102 for installation by inserting the cables 102 and connectors 104 into the bracket 108. The insertion tool 116 is then slid on to the assembly of cables (FIG. 6) with the arms 128, 130, 132 disposed about the cables 102. The insertion tool 116 is moved into position with the ends of the projections 134 in contact with the bracket 108 (FIG. 7) such that the flanges 142 are disposed in contact on the bottom of the connectors 104. Using the U-shaped portion 120 as a handle, the operator may orient and align the row of cables with the drawer 110 (FIG. 7) and insert the connectors 104 into the receptacles 106 (FIG. 8) with the bracket 108 pushed against the drawer 110 by the projections 134. Once the cables 102 are coupled to the drawer 110, the insertion tool 116 may be slid in the reverse direction to remove the insertion tool from the assembly. It should be appreciated that the insertion tool 116 may be used to insert the row of cables into any of the rows within the drawer 110 even if other rows of cables have already been installed.

Figure 9:
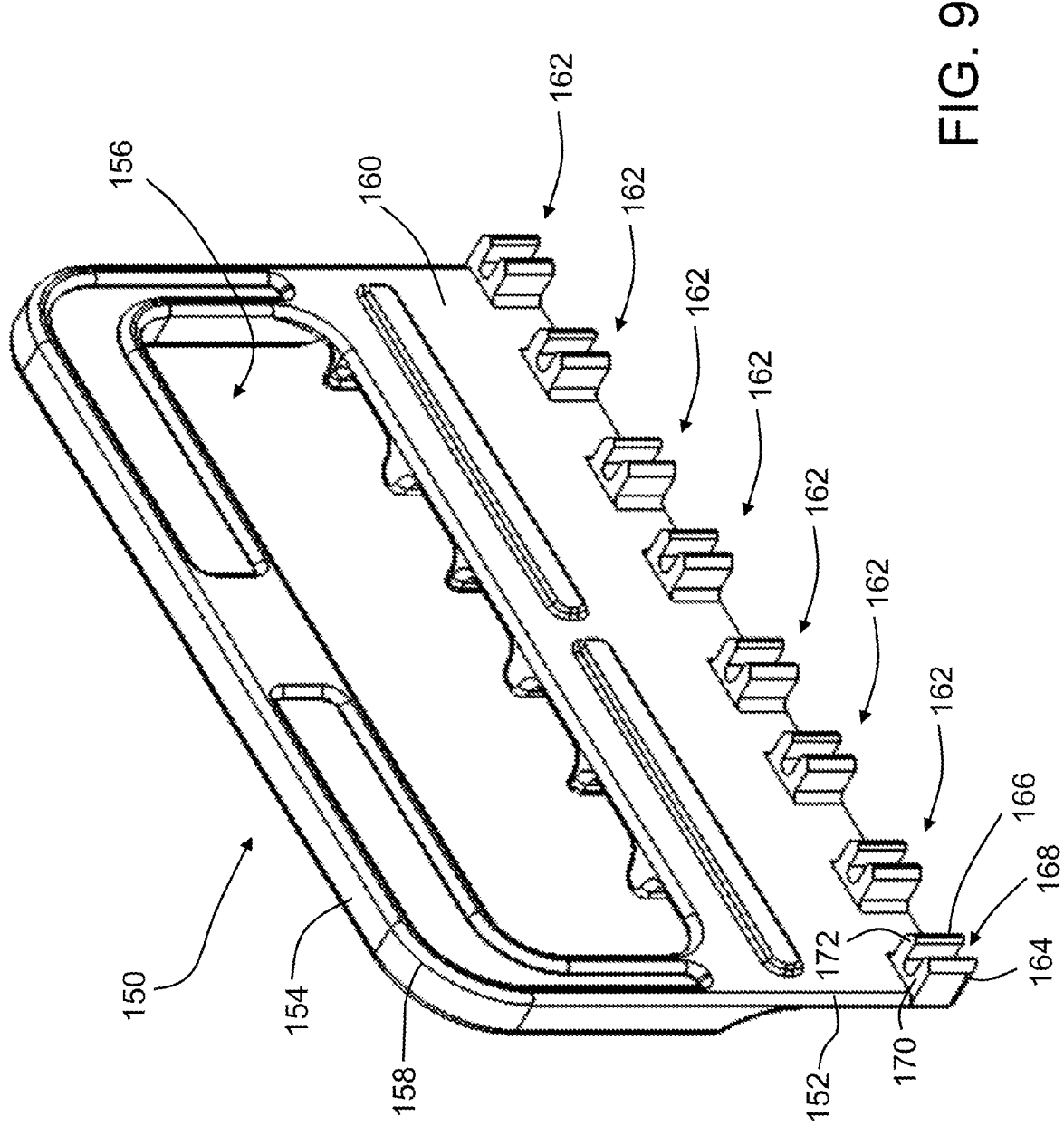
FIG. 9 illustrates a perspective view of an exemplary removal tool in accordance with one or more embodiments.
Figure 10:
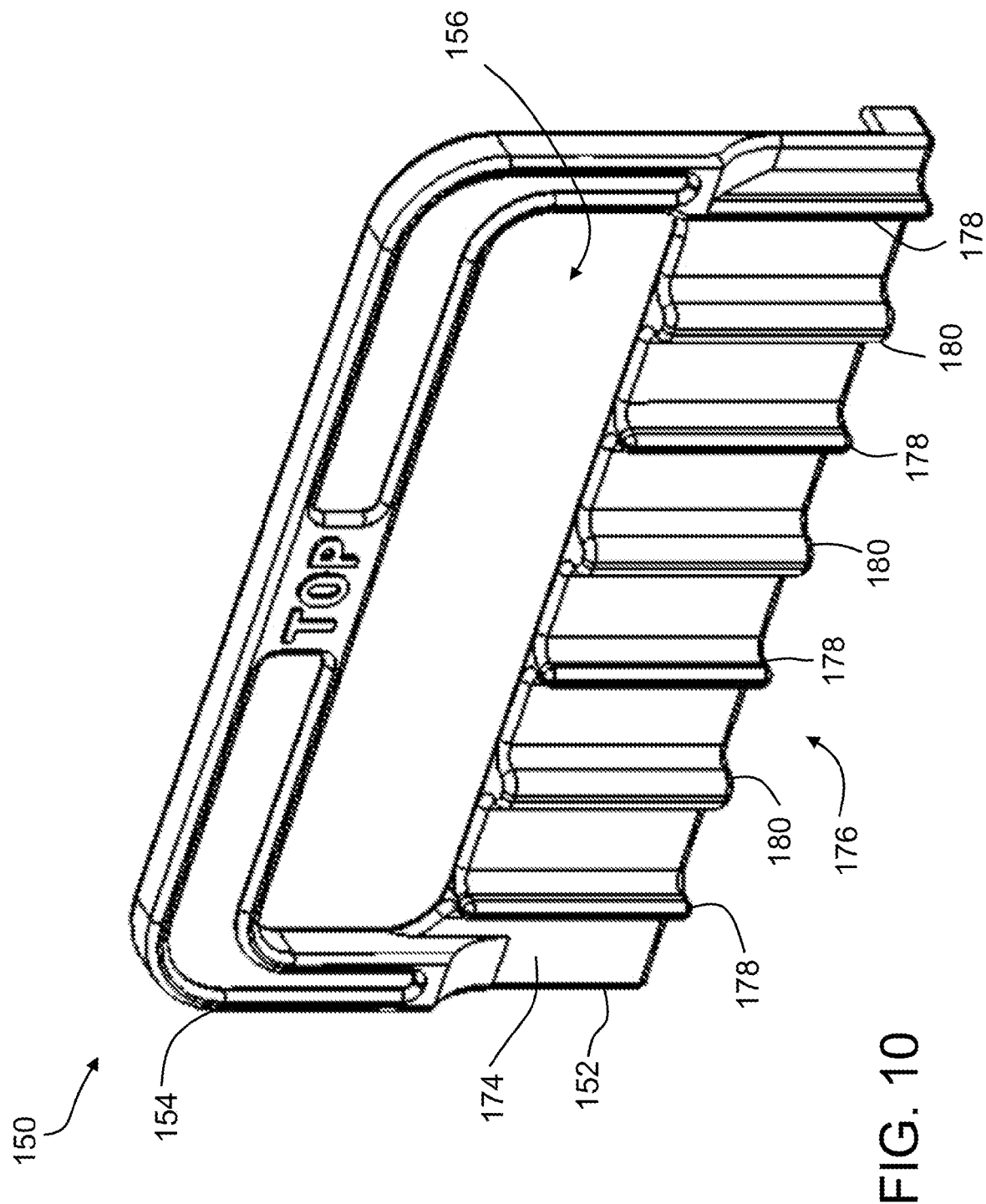
FIG. 10 illustrates a perspective view of the removal tool of FIG. 10.
Figure 11:
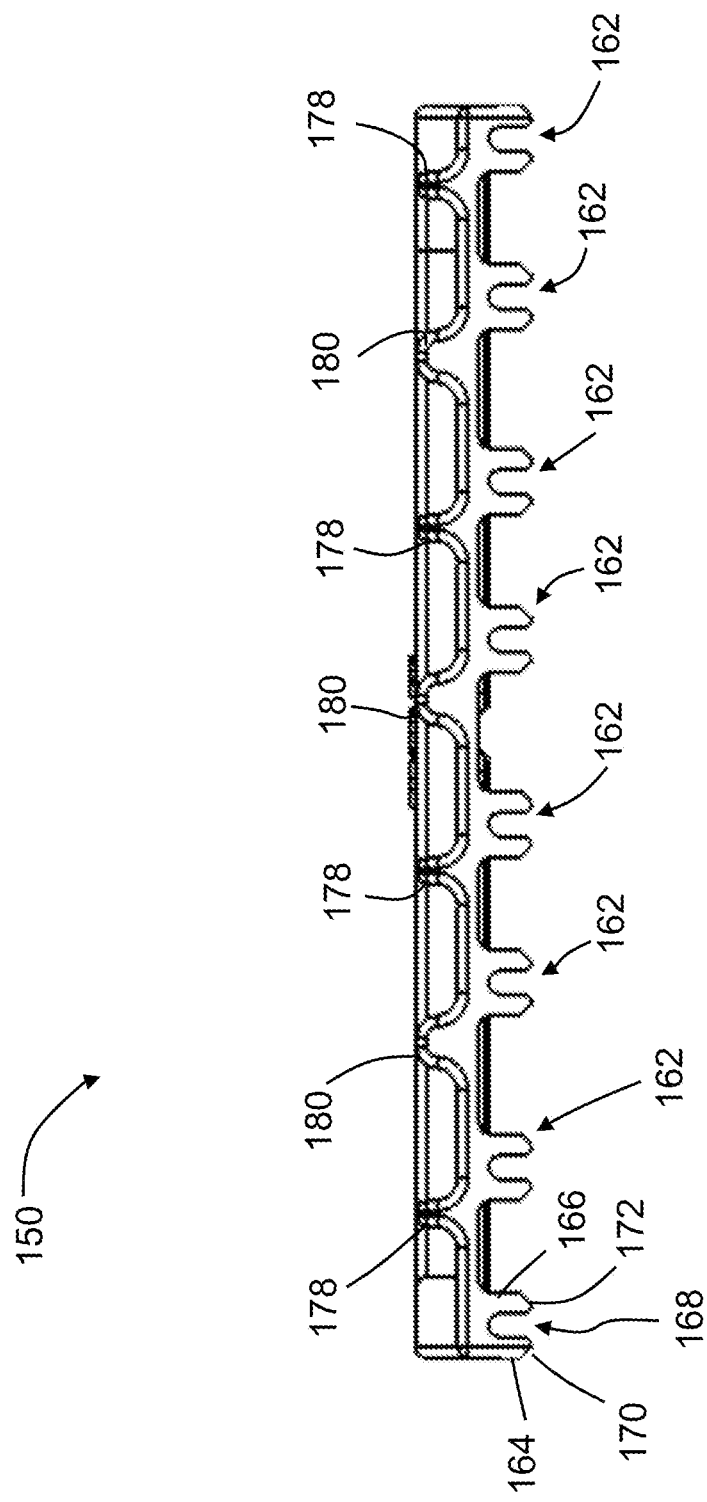
FIG. 11 illustrates an end view of the removal tool of FIG. 10.

Referring now to FIGS. 9-11, an exemplary removal tool 150 is shown that may be used to decouple and extract a row of cables 102 from the drawer 110. The removal tool 150 includes a generally planar body 152 with a U-shaped handle portion 154 extending from one end. The U-shaped handle portion 154 defines an opening 156 that is sized to receive the operator's fingers. The U-shaped handle portion 154 includes a flange member 158 that increases the thickness of the handle and facilitates the grasping of the handle by the operator while allowing the body portion 152 to remain relatively thin. It should be appreciated that a relatively thin body portion 152 allows the body portion 152 to be inserted between rows of cables 102 to allow an operator to remove an internal row of cables from the drawer 110 without removing the adjacent rows.

Extending from one side 160 are a plurality of engagement members 162 that are configured to engage the tab member 114 and release the connector mechanism from the receptacle 106. In the exemplary embodiment, each engagement member 162 is comprised of a first projection 164 and a second projection 166 that are separated by a slot 168. The slot 168 is sized to fit around the shaft 115 (FIG. 1) to allow the ends 170, 172 of the projections 164, 166 to engage the head portion 117 of the tab member 114. In one embodiment, an angled surface is arranged on an end of the projections 164, 166 distal from the side 160 of the body portion 152.

On an opposing side 174 from the engagement member 162, the removal tool 150 has a plurality of ribs 176. The ribs 176 are generally tapered with a base portion being thicker than the tip to allow them to fit in between the cables 102 when the removal tool 150 is inserted into a matrix of cables. In one embodiment, the plurality of ribs 176 includes a first plurality of ribs 178 and a second plurality of ribs 180. The ribs 180 are wider than the ribs 178 to accommodate the walls 141 in the drawer 110. Each of the ribs 176 has a first side and a second side with the first side being positioned opposite one of the projections 164. In one embodiment, the engagement members include a plurality of engagement members arranged opposite the ribs 176 and an engagement member arranged on the end.

Figure 12:
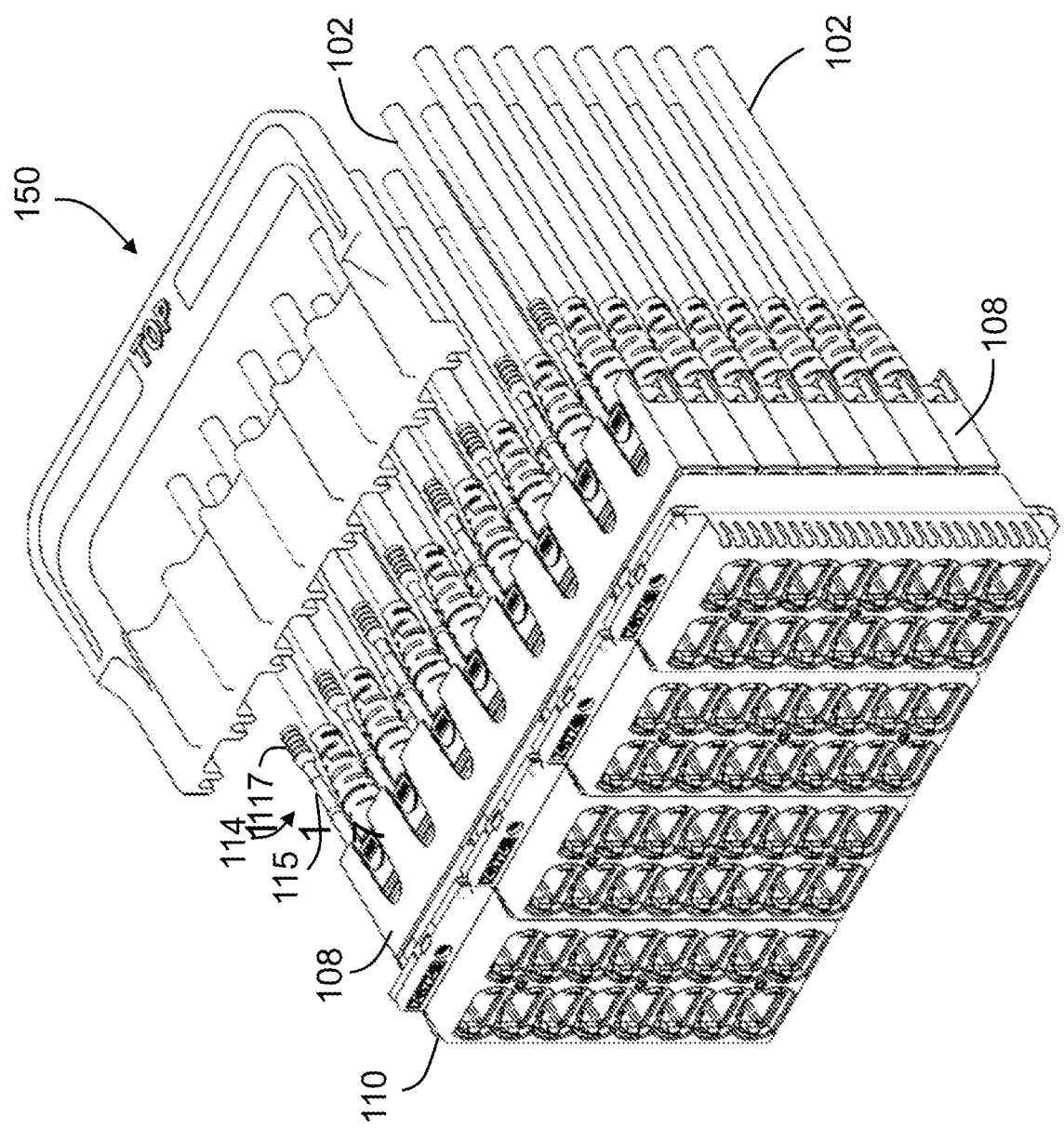
FIG. 12 illustrates a perspective view of the removal tool of FIG. 10 being coupled to a row of cables tool in accordance with one or more embodiments.
Figure 13:
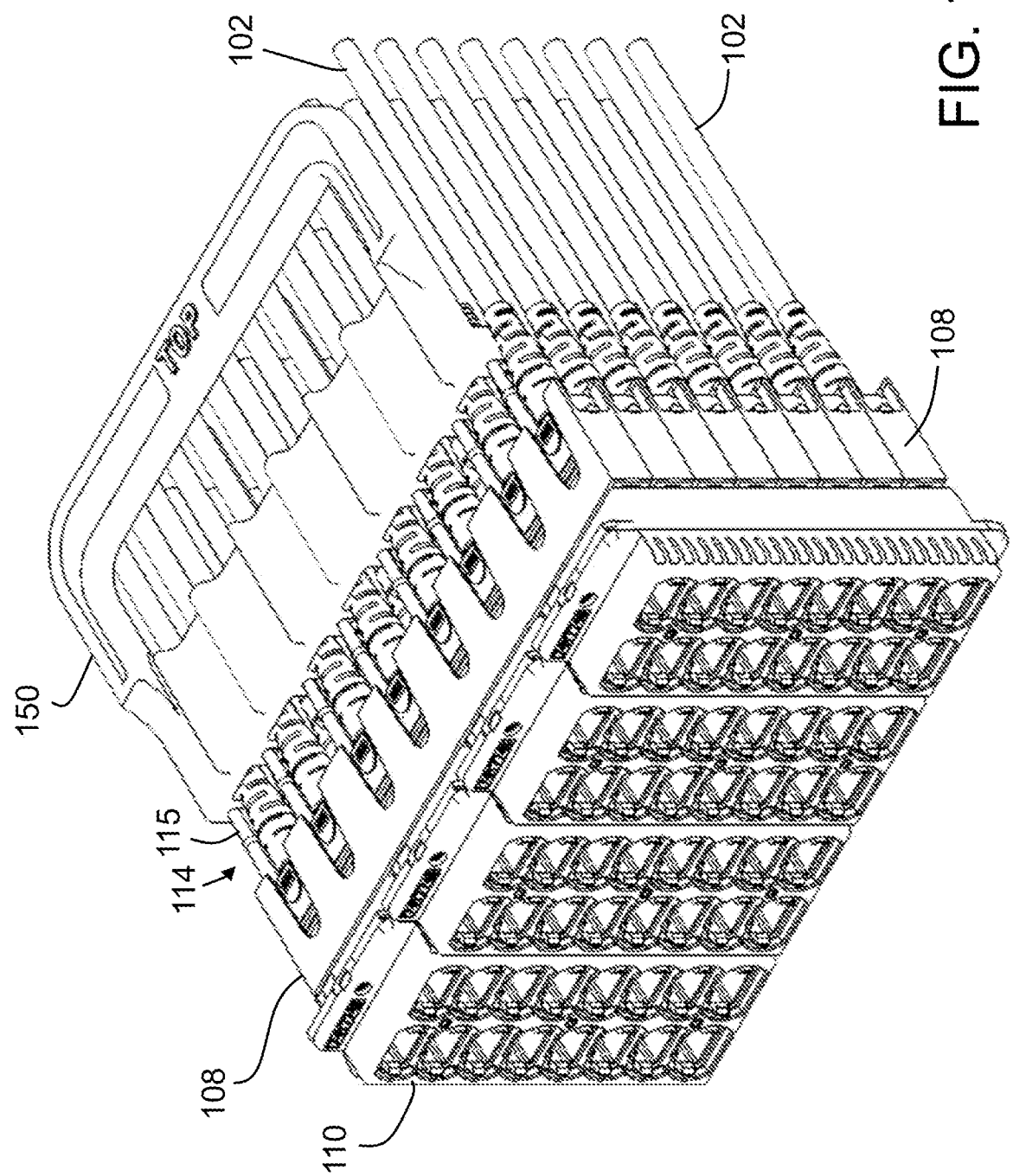
FIG. 13 illustrates a perspective view of the removal tool of FIG. 10 coupled on a row of cables tool in accordance with one or more embodiments.
Figure 14:
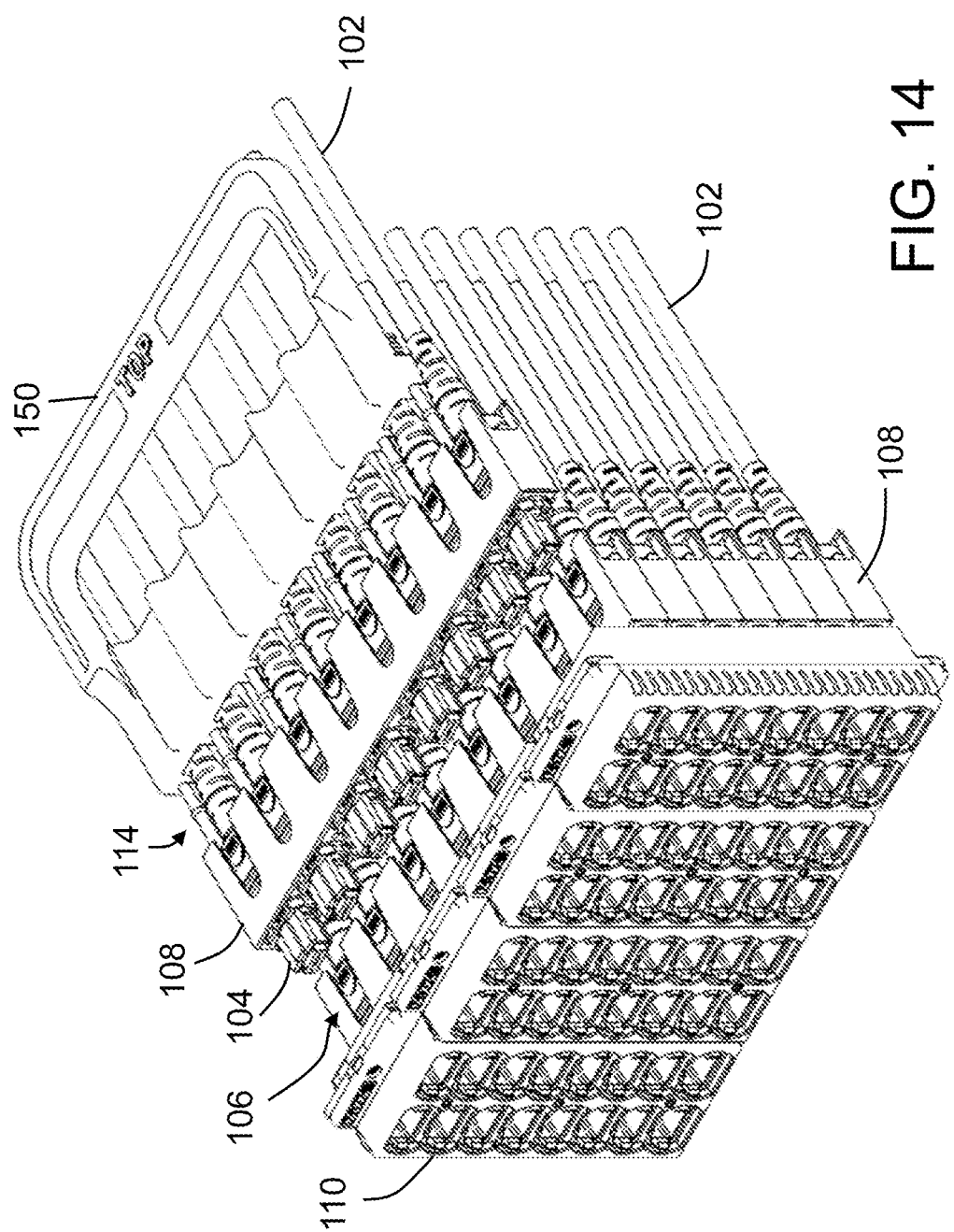
FIG. 14 illustrates a perspective view of the row of cables being removed from the receptacles using the removal tool of FIG. 10 tool in accordance with one or more embodiments.

Referring now to FIGS. 12-14, the operation of the removal tool 150 is shown for extracting a row of cables 102 from the drawer 110. First the operator identifies the row of cables 102 to be removed and slides the removal tool 150 over the row of cables 102 with the engagement members 162 facing the connectors 104 (FIG. 13). The engagement members 162 are inserted onto the tab members 114 such that the shaft portion 115 is positioned within the slots 168. In this position, the engagement member 162 is arranged between the head portion 117 and the receptacle 106. The operator then grasps the handle portion 154 and moves the removal tool 150 in the direction away from the drawer 110. This causes the ends 170, 172 to contact the head portion 117 of the tab member 114, resulting in the connector mechanism disengaging from the receptacle 106 (FIG. 14). The operator then continues to move the row of cables 102 away from the drawer 110 and separates the row of cables 102 from the cable matrix (FIG. 14). It should be appreciated that the removal tool 150 may be used to extract any row of cables from the matrix and that the tool may be used to extract an internal row without removing the adjacent rows.

Embodiments of the invention provide a system having the insertion tool 116 and the removal tool 150 that provides advantages in the insertion and extraction of rows of cables 102 having connectors 104 in a cable matrix coupled to a drawer. The system provides advantages in reducing the time for installation and removal. The system provides further advantages in increasing the reliability of servicing by reducing the risk of cables being installed in the wrong receptacles.

The values shown and described herein in connection with the various embodiments are illustrative. In some embodiments, values or configurations different than those explicitly described herein may be used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A tool for installing a row of cables from a cable array, each cable having a connector configured to couple with a receptacle and a tab member configured to disengage the connector from the receptacle, the tool comprising:
    a body;
    a first plurality of arms extending from one end of the body, the plurality of arms defining a plurality of openings, each of the plurality of openings sized to receive one of the connectors;
    a second plurality of arms, each of the second plurality of arms being disposed between pairs of adjacent arms from the first plurality of arms, each of the second plurality of arms having a first flange on one side, the first flange being substantially perpendicular to the second plurality of arms; and
    a plurality of projections, each of the plurality of projections extending from an end of each of the second plurality of arms.

2. The tool of claim 1 wherein the first plurality of arms includes a third plurality of arms, the third plurality of arms having a second flange on one side, the second flange being substantially perpendicular to the third plurality of arms.

3. The tool of claim 2 wherein the third plurality of arms further includes a fourth arm having the second flange on one side and a fifth arm, the fifth arm having a substantially square shape.

* * * * *